United States Patent [19]

Johnson

[11] Patent Number: 4,922,957

[45] Date of Patent: May 8, 1990

[54] VALVE WITH REPLACEABLE SEAL ELEMENT

[75] Inventor: Jerry E. Johnson, Houston, Tex.

[73] Assignee: National-Oilwell, Houston, Tex.

[21] Appl. No.: 321,157

[22] Filed: Mar. 8, 1989

[51] Int. Cl.[5] ............................................ F16K 15/06
[52] U.S. Cl. ........................... 137/516.29; 137/543.23; 137/902; 251/332
[58] Field of Search .................... 251/332; 137/516.27, 137/516.29, 543.15, 543.23, 902

[56] References Cited

U.S. PATENT DOCUMENTS

| | | | |
|---|---|---|---|
| 2,116,968 | 5/1938 | Casner | 137/902 X |
| 2,148,850 | 2/1939 | Deakins | 137/902 X |
| 2,163,472 | 6/1939 | Shimer | 137/516.29 |
| 2,214,799 | 9/1940 | Sharp et al. | 137/902 X |
| 2,402,713 | 6/1949 | Volpin | 137/902 X |
| 2,495,880 | 1/1950 | Volpin | 137/516.29 |
| 2,745,631 | 5/1956 | Shellman | 137/543.23 X |
| 2,898,082 | 8/1959 | Von Almen et al. | 251/333 |
| 2,900,999 | 8/1959 | Courtot | 137/516.27 X |
| 3,053,501 | 9/1962 | Varga | 251/332 |
| 3,191,617 | 6/1965 | Maddox | 137/516.29 |
| 3,409,039 | 11/1968 | Griffin | 137/516.29 |
| 3,483,885 | 12/1969 | Leathers | 137/516.29 X |
| 3,540,472 | 11/1970 | Brady et al. | 137/516.29 |
| 3,861,646 | 1/1975 | Douglas | 251/332 X |
| 4,039,003 | 8/1977 | Cheek | 137/516.29 |
| 4,076,212 | 2/1978 | Leman | 251/332 |
| 4,180,097 | 12/1979 | Sjoberg | 137/516.29 |
| 4,215,717 | 8/1980 | Trösch | 137/516.29 X |

FOREIGN PATENT DOCUMENTS 181927 6/1966 U.S.S.R. .......................... 137/516.29

*Primary Examiner*—John Rivell
*Attorney, Agent, or Firm*—Burns, Doane, Swecker & Mathis

[57] ABSTRACT

A valve assembly comprises a rigid seat and a valve for opening and closing the seat. The valve comprises a rigid valve body and an elastomeric seal element mounted on the valve body. The seal element includes smoothly concave seat-engaging surface which tapers in a forward direction. An annular recess formed in a rear surface of the seal element extends to a depth at least one-third of the distance from a rear end to a front end of the concave surface to define therewith a flexible lip. The walls of the recess are oriented such that pressures present behind the valve intensify the engagement of the seal element with both the seat and valve body.

19 Claims, 2 Drawing Sheets

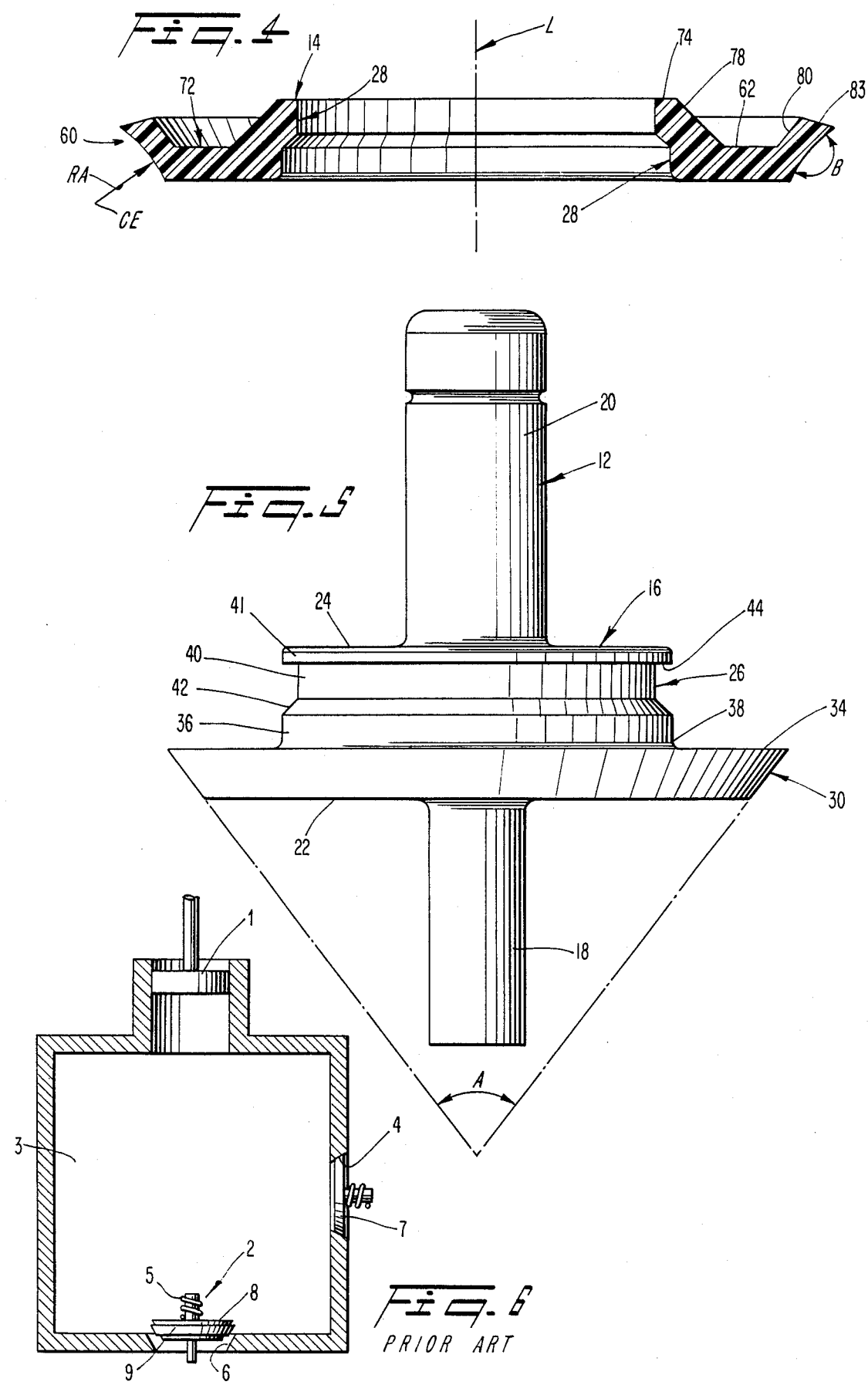

VALVE WITH REPLACEABLE SEAL ELEMENT

BACKGROUND OF THE INVENTION

The present invention relates to reciprocating closure valves, especially for use in pumps which pump fluids containing entrained solids.

Fluid pumps are conventional which, as depicted schematically in FIG. 6, employ a reciprocating piston 1 or the like to suck fluid past a reciprocable inlet valve 2 and into a chamber 3 during a suction stroke, and then force the fluid through a valved discharge port 4 during a discharge stroke. The inlet valve 2 is mounted for reciprocation and is biased by a spring 5 to a closed position against a rigid seat 6. The inlet valve 2 is pulled open by a low pressure produced in the chamber 3 during a retraction stroke of the pump piston, and thereafter is pushed closed by a combination of the spring force and high pressure produced in the chamber 3 during an extension stroke of the pump piston. When the inlet valve closes, the high pressure fluid within the chamber 3 is pushed out through the discharge port 4 which itself contains a spring-biased valve 7.

The inlet valve 2 typically comprises a metal body 8 on which an annular elastomeric seal element 9 is mounted to make contact with the seat 6. The mounting of the seal element may require the provision of retaining plates or the like which must be detached and reattached in order to enable worn seal elements to be replaced. The presence of such retaining plates increases the initial valve cost and complicates the replacement of worn seal elements. The latter shortcoming is of particular concern when the fluid being pumped contains solids (e.g., dirt, gravel, tree parts, etc.) which accelerate the wear of the seal element. Since the pump is inoperative during replacement of the seal element, it will be appreciated that enhanced pump efficiency would be realized if the time for replacing a seal element could be reduced, and if the life span of the seal element could be increased.

SUMMARY OF THE INVENTION

The present invention relates to a resilient seal element adapted to be removably mounted on the rigid valve body. The seal element comprises an annular ring member formed of an elastomeric material and defining a front-to-rear extending axis. The ring member includes a forwardly facing front surface, a rearwardly facing rear surface, and inner and outer circumferential surfaces. The inner circumferential surface is engageable with an outer circumferential surface of a rigid valve body. The outer circumferential surface is engageable with a rigid valve seat and is of concave configuration, tapering in a forward direction. The rear surface includes an annular, rearwardly open recess which includes first and second side walls extending in generally front-to-rear directions. The recess has a depth extending forwardly beyond a longitudinal rear end of the concave surface to define therewith a flexible lip.

Preferably, the concave surface is smoothly radiused between its front and rear ends. The depth of the recess preferably extends to a level coinciding with at least one-third of the distance from the rear to the front ends of the concave surface.

The present invention also relates to a valve comprised of a valve body upon which the seal element is mounted.

Furthermore, the present invention contemplates a valve assembly comprising a valve seat together with a valve which includes a valve body and seal element mounted thereon.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 4 is a longitudinal sectional view taken through the seal element;

FIG. 5 is a side elevational view of the valve body; and

FIG. 6 is a schematic view of a prior art pump in which the present invention can be used.

DETAILED DESCRIPTION OF A PREFERRED EMBODIMENT OF THE INVENTION

Figure 1:
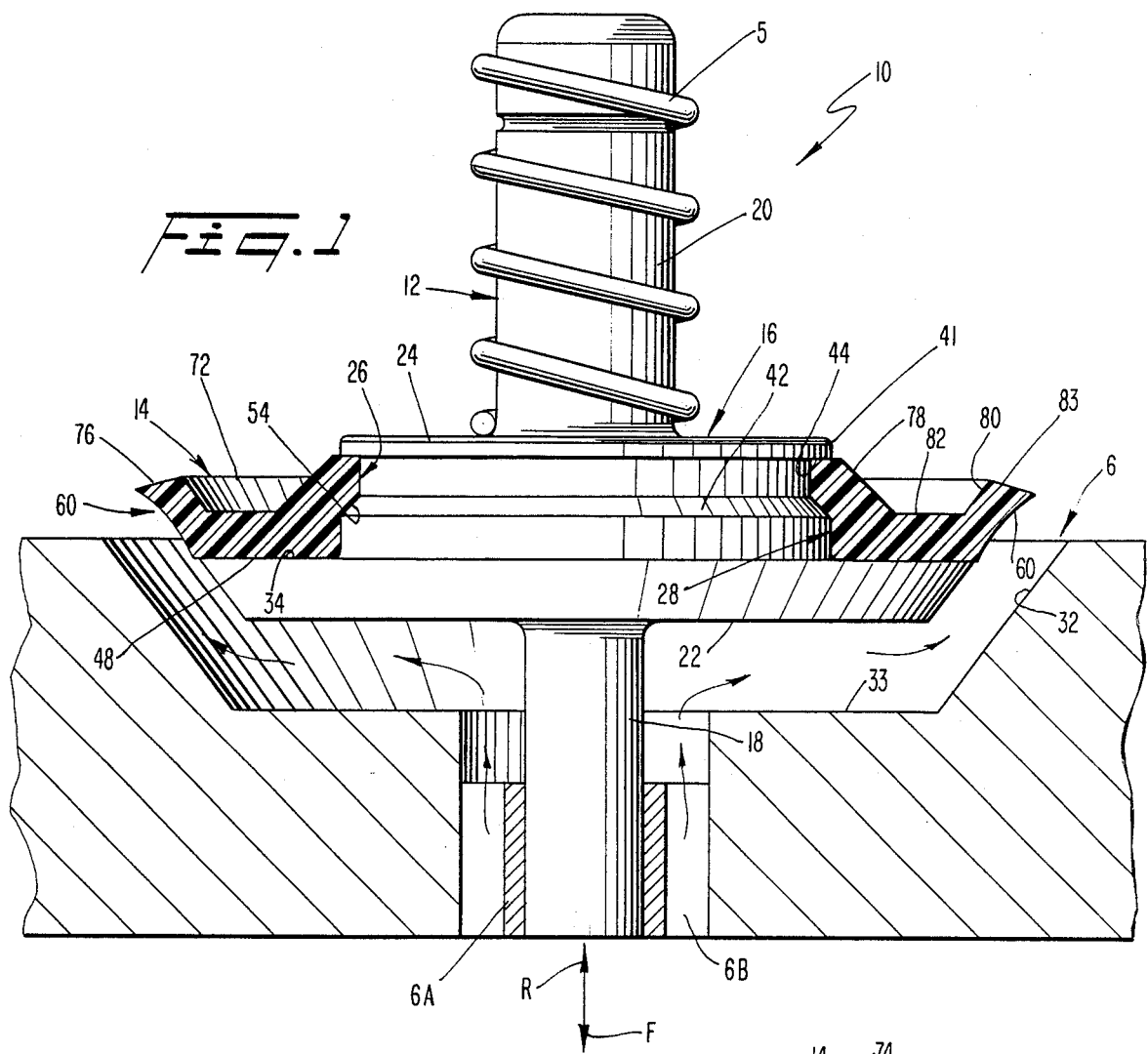
FIG. 1 is a longitudinal sectional view taken through a valve assembly according to the present invention, with the valve in an open condition.
Figure 2:
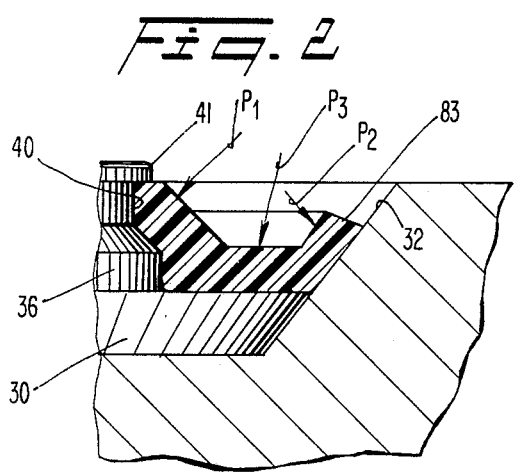
FIG. 2 is a fragmentary longitudinal sectional view depicting the valve in a closed condition.
Figure 3:
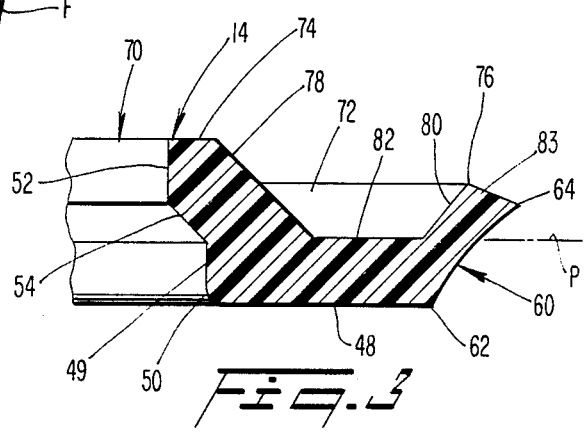
FIG. 3 is an enlarged fragmentary section of a seal element of the valve.

A valve 10 in accordance with the present invention comprises a body 12 (see FIGS. 1, 5) and an annular seal element 14 (see FIGS. 1-4) mounted on the body 12. The body 12 is formed of a relatively rigid material such as metal for example, and the seal element is formed of an elastomeric material such as plastic or rubber for example.

The body comprises a disc 16 and front and rear stems 18, 20 extending coaxially in opposite directions from respective front and rear sides 22, 24 of the disc 16. A coil spring 5 is mounted around the rear stem 20 to apply forward pressure to the rear side 24 in a manner biasing the valve toward a seat 6 in a forward direction F. The front stem 18 slides within a cylindrical guide 6A carried by radial arms 6B of the seat 6. The front side 22 is adapted to abut a radial surface 33 of the seat 6. The disc 16 includes an annular outer circumferential surface 26 against which an annular inner circumferential surface 28 of the seal element snugly engages. The disk circumferential surface 26 comprises a frusto-conical portion 30 which tapers forwardly to the front side 22 of the disc. The included angle A (FIG. 5) defined by that frusto-conical portion 30 corresponds to the angle defined by a rigid frusto-conical surface 32 of the valve seat 6.

Extending radially inwardly from the rear end of the frusto-conical portion 30 is a radial shoulder portion 34 which faces longitudinally rearwardly. A cylindrical portion 36 extends rearwardly from the shoulder portion 34 and joins the latter by means of a concavely curved portion 38. A cylindrical portion 40 is disposed rearwardly of the cylindrical portion 36 and is interconnected therewith by a frusto-conical portion 42 which tapers in a rearward direction, whereby the cylindrical portion 40 is of smaller diameter than the cylindrical portion 36.

Disposed at the rear end of the cylindrical portion 40 is a flange 41 which forms a radial shoulder 44. That shoulder 44 faces forwardly and projects radially outwardly to a lesser extent than the cylindrical portion 34.

The seal element 14 includes a front radial surface 48 which is adapted to rest against the rearwardly facing shoulder 34 of the disc 16. The inner circumferential surface 28 of the seal element 14 defines a front-to-rear extending longitudinal axis L and comprises a cylindrical portion 49 which is joined to the radial surface 48 by means of a convexly curved portion 50. The cylindrical portion 49 and the curved portion 50 are adapted to rest against the cylindrical portion 36 and curved portion 38, respectively, of the disc 16.

The inner circumferential surface 28 further includes a cylindrical portion 52 disposed rearwardly of the cylindrical portion 49 and interconnected therewith by a frusto-conical portion 54. The cylindrical portion 52 is coaxial with, and of smaller diameter than, the cylindrical portion 49, whereby the frusto-conical portion 54 tapers in a rearward direction. The portion 54 preferably defines an included angle (i.e., the cone angle) of ninety degrees. The cylindrical portion 52 and the frusto-conical portion 54 are adapted to engage the cylindrical portion 40 and frusto-conical portion 42, respectively, of the disc. The longitudinal axes of those surface portions coincides with the front-to-rear direction F-R.

The seal element 14 further includes an annular outer circumferential surface 60 which constitutes a seat-engaging surface. That surface 60, rather than being of conventional frusto-conical shape in longitudinal section, is of concave configuration (see FIG. 3). The concave surface 60 is radiused, i.e., is defined by a radius RA rotated about a center CE (see FIG. 4). Thus, in FIG. 3 the longitudinal rear end 64 of the surface 60 would lie to the right of a line tangent to the front end 62 of the surface 60. The orientation of the concave surface 60 is such that it tapers in a forward direction, i.e., a radius from the axis L to the front end 62 is smaller than a radius from the axis L to a rear end 64 of the surface 60.

The rear surface 70 of the seal element contains a rearwardly opening annular recess 72 which is spaced from the radially innermost and outermost ends of the rear surface 70. Thus, the recess 72 is flanked by a rearwardly facing radial shoulder portion 74 and a surface portion 76 of the rear surface. The shoulder portion 74 is adapted to engage the forwardly facing shoulder portion 44 of the disc.

The recess 72 includes a radially inner side wall 78 and a radially outer side wall 80, both walls being of frusto-conical configuration. A radially disposed floor 82 of the recess interconnects the walls 78, 80.

The wall 78 is disposed parallel to the frusto-conical surface portion 14 of the seal element as viewed in cross section (FIG. 3), and the wall 80 is disposed at least generally parallel to the rear portion of the concave surface 60 valve is viewed in longitudinal section. The floor 82 of the recess is parallel to the front surface 48 of the seal element. The recess 72 has a depth extending forwardly to a location disposed longitudinally forwardly of the rear end 64 of the surface 60, i.e., to a location disposed at least one-third of the distance from the rear end 62 to the front end 64 and most preferably about half of that distance. Thus, a plane P (FIG. 3) defined by the floor 82 would most preferably intersect the surface 60 at a location which is disposed at least one-third of the way from the rear end 64 to the front end 62. Hence, the wall 80 and the surface 60 define therebetween a relatively thin lip 83 which is able to flex radially inwardly and outwardly toward and away from the axis L relative to the solid part of the seal element located forwardly of the plane P.

In order to mount the seal element onto the disc 16, the seal element is radially stretched and fitted over the outer circumferential surface 26 of the section from the rear. The seal element is dimensioned such that its inner circumferential surface 28 is slightly smaller in diameter than the outer circumferential surface 26 of the disc prior to the seal element being stretched. Therefore, after the seal element 14 has been inserted onto the disc and released, the inner circumferential surface 28 of the seal element will tightly grip the outer circumferential surface 26 of the disc to form a seal thereagainst.

During operation of the valve, the valve is opened in a rearward direction R in response to suction (negative pressure) produced by a retraction of the pump piston 1. This permits fluid to flow rearwardly between the valve 10 and the seat 6, as indicated by the arrows in FIG. 1. When the pump piston 1 is thereafter extended, a high pressure is produced behind the valve 10, forcing the valve to be displaced forwardly toward the seat 6. Initial contact of the valve against the seat surface 32 occurs at the rear end 64 of the seal element 14. Thus, the interface between the surfaces 60 and 32 is immediately isolated from the high pressure fluid and thus from any solids which are being propelled by that high pressure and which could otherwise cause serious damage to the seat-engaging face 60 of the seal element.

As the valve advances farther forwardly, the flexible lip 83 begins to be flexibly rotated radially inwardly. Accordingly, the seat-contacting area of the surface 60 becomes gradually enlarged, causing fluid and solids disposed between the surface 60 and the seat surface 32 to be propelled forwardly and avoid being trapped between the surfaces 60, 32. It will be appreciated that if fluid were to become trapped in that manner, it would eventually be expelled outwardly as a high-speed stream of fluid which would eventually produce considerable wearing of the metal seat and any other surrounding metal parts against which the stream impacted.

The deforming of the frusto-conical surface 60 is facilitated by the flexibility of the lip 83 as produced by the presence of the recess 72. That is, the lip 83 is readily able to flex relative to the thicker portion of the seal element located forwardly of the plane P. This flexibility also enables the lip 83 to readily yield upon encountering solids which may become interposed between the seal element and the seat surface 32. Since the forward portion of the surface 60 is oriented close to parallelism with the seat surface 32 (as compared to a highly non-parallelism with surface 32 defined by the rear portion of the surface 60), only the rear portion of the surface 60 will tend to undergo an appreciable flexing toward the axis L during valve closing. Since that rear portion of surface 60 constitutes a part of the flexible lip 83, such flexing can be easily accommodated without causing the seal element to be lifted from the shoulder 34 of the valve body. Moreover, since the front portion of the surface 60 undergoes little flexing, the seal element will not tend to be lifted from the shoulder 34 as that front portion engages the seat surface 32.

After all of the seat-engaging surface 60 has made engagement with the seat surface (FIG. 2), further advancement of the valve occurs until the front surface 22 of the disc contacts the radial surface 33 of the seat to terminate the valve movement. At this point, the high fluid pressure behind the valve acts against the walls 78, 80 of the recess 72 to push the inner and outer circumferential surfaces 28, 60 of the seal element tightly against the disc surface 26 and the seat surface 32, respectively. The parallel relationship between wall 78 and the frusto-conical surface portion 54 of the seal element is important, because it results in the pressure $P_1$ being applied perpendicularly to the surface portion 42 of the disc. Thus, the pressure $P_1$ will not tend to displace the inner surface 28 forwardly or rearwardly relative to the disc surface 26 which could otherwise produce accelerated wearing of the seal element.

The floor 82 of the recess is oriented parallel to the front surface 48 of the seal element, whereby the pressure $P_3$ acts perpendicularly relative to the shoulder 34 of the disc to intensify the sealing action occurring between the seal element and the disc at that location.

The seal element having the recess 72 is characterized by a relatively thin cross-section which enhances the flexibility of the seal element and enables the seal element to be installed onto the disc 16 by being stretched with conventional hand tools. There is no need to retain the seal element by releasably retaining plates, since the seal element is sandwiched between the shoulders 34, 44 of the valve body. Hence, the initial cost of the valve is low, and the time and effort necessary to effect a seal replacement is reduced. Those characteristics make the seal element particularly useful in environments which rapidly wear out the seal elements, such as the pumping of mud and other solids-entraining fluids. A field operator can quickly replace a seal element to minimize the down-time of the pump.

Once the seal element has been installed, it is effectively constrained against longitudinal movement between the shoulders 44, 34 of the disc 16. As noted above, by making those shoulders integral with the disc, there is no need to deal with detachable retaining plates as has been commonplace up to now.

Therefore, it will be appreciated that a seal element in accordance with the present invention produces a forward pumping of fluids out of the sealing interface without creating a tendency for the seal element to rise off the shoulder of the valve body. Also, the seal element is highly flexible at its radially outer end to be able to conform to the presence of solids while producing an effective seal. The seal element also makes use of high pressures present behind the valve to enhance the sealing force of the seal element against both the seat and the disc in a manner which does not induce any rubbing of the seal against the disc. The seal is thin and thus highly flexible so as to be capable of being easily stretched over the disc without a serious risk of being damaged. The seal element is retained on the valve body without the need for removable retaining plates and the like.

The above-described advantages of effective sealing action and reduced wear make the present invention highly useful in the pumping of all fluids, but especially fluids in which solids are entrained and which produce accelerated wearing of the seal element. The seal element according to the present invention tends to resist wear and is relatively inexpensive and easy to replace.

For example, the concave shape of the surface 60 could be defined by front and rear frusto-conical surfaces which intersect at plane P. However, due to the angle which would be defined at the intersection of those two surfaces, there would be a greater chance for fluids or solids to become trapped between the surfaces 60, 32 than in the case of the radiused shape disclosed earlier herein.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A resilient seal element adapted to be removably mounted on a rigid valve body, comprising an annular ring member formed of an elastomeric material and defining a front-to-rear extending axis, said ring member including:

a forwardly facing front surface, a rearwardly facing rear surface, an inner circumferential surface engageable with an outer circumferential surface of a rigid valve body, and an outer circumferential surface engageable with a rigid valve seat, said outer circumferential surface being of concave configuration and tapering in a forward direction, said rear surface including an annular, rearwardly open recess therein which includes first and second sidewalls extending in generally front-to-rear directions, said recess having a depth extending forwardly beyond a longitudinal rear end of said concave surface to define therewith a flexible lip, said inner circumferential surface of said seal element including front and rear cylindrical surface portions interconnected by a frusto-conical interconnecting surface portion, said front cylindrical surface portion being of larger diameter than said rear cylindrical surface portion, each of said front and rear cylindrical surface portions and said interconnecting surface portion having a longitudinal axis which coincides with said front-to-rear extending axis, said front and rear cylindrical surface portions and said interconnecting surface portion arranged to engage corresponding surface portions of a rigid valve body.

2. A resilient seal element according to claim 1, wherein said concave surface is smoothly radiused from front-to-rear longitudinal ends thereof.

3. A resilient seal element according to claim 2, wherein said depth extends at least about one-third of the distance from a longitudinal rear end of said concave surface to a longitudinal front end thereof.

4. A resilient seal element according to claim 1, wherein said depth extends at least about one-third of the distance from a longitudinal rear end of said concave surface to a longitudinal front end thereof.

5. A resilient seal element according to claim 1, wherein said first and second sidewalls are forwardly convergent, said recess including a radially disposed floor interconnecting front ends of said first and second sidewalls and disposed parallel to said front surface, said first sidewall disposed substantially parallel to said interconnecting surface portion.

6. A resilient seal element according to claim 5, wherein each of said first and second sidewalls includes a rearwardmost end spaced radially from radially outer and inner edges of said rear surface.

7. A resilient seal element according to claim 1, wherein each of said first and second sidewalls includes a rearwardmost end spaced radially from radially outer and inner edges of said rear surface.

8. A resilient seal element according to claim 1, wherein said first sidewall is oriented substantially parallel to said rear cylindrical surface portion.

9. A valve comprising:
a rigid valve body defining a front-to-rear extending axis and comprising an outer circumferential surface and front and rear lateral shoulders facing one another in axially spaced relationship, said front shoulder extending laterally outwardly farther than said rear shoulder, and
a resilient seal element removably mounted on said body and comprising an annular ring member formed of elastomeric material and including:
a forwardly facing front surface engaging said front shoulder,
a rearwardly facing rear surface engaging said rear shoulder,
an inner circumferential surface engaging said outer circumferential surface of said valve body, and
an outer circumferential surface engageable with a rigid valve seat, said outer circumferential surface having front and rear ends and being of concave configuration and tapering in a forward direction, said concave surface being smoothly radiused between said front and rear ends and being engageable with a frusto-conical seat surface, said front end disposed radially outwardly beyond said front shoulder when said seal element is in a relaxed state,
said rear surface including an annular rearwardly open recess therein which includes first and second sidewalls extending in generally front-to-rear directions, said recess having a depth extending forwardly at least about one-third of the distance from said rear end to said front end of said concave surface to define therewith a flexible lip.

10. A valve according to claim 9, wherein said inner circumferential surface of said seal element includes first and second cylindrical surface portions interconnected by a first frusto-conical interconnecting surface portion, said outer circumferential surface of said valve body including third and fourth cylindrical surface portions interconnected by a second frusto-conical interconnecting surface portion, said first and second cylindrical surface portions engaging said third and fourth cylindrical surface portions, said first interconnecting surface portion engaging said second interconnecting surface portion, said first, second, third and fourth cylindrical surface portions and said first and second interconnecting surface portions having longitudinal axes which coincide with said front-to-rear extending axis, said second and fourth cylindrical surface portions disposed rearwardly of, and having smaller diameters than, said first and fourth cylindrical surface portions, said second sidewall of said recess being frusto-conical and oriented parallel to said first and second interconnecting surface portions as said valve is viewed in longitudinal section.

11. A valve according to claim 10, wherein each of said first and second sidewalls includes a rearwardmost end spaced radially from radially outer and inner edges of said rear surface.

12. A valve according to claim 9, wherein said recess includes a radially disposed floor interconnecting front ends of said first and second sidewalls and disposed parallel to said front surface.

13. A valve according to claim 12, wherein each of said first and second sidewalls includes a rearwardmost end spaced radially from radially outer and inner edges of said rear surface.

14. A valve according to claim 9, wherein a portion of said rear surface of said seal element extending from a radially inner edge thereof to a rearwardmost end of said second sidewall engages said rear shoulder of said valve body.

15. A valve assembly according to claim 14, wherein said concave surface is smoothly radiused from front-to-rear longitudinal ends thereof.

16. A valve assembly according to claim 14, wherein said depth extends at least about one-third of the distance from a longitudinal rear end of said concave surface to a longitudinal front end thereof.

17. A valve assembly comprising:
a valve seat including a frusto-conical seat surface defining a front-to-rear axis and forming an included angle, said seat surface tapering in a forward direction, and
a valve comprising a rigid valve body and a flexible seal element, said valve being movable toward and away from said seat surface,
said valve body comprising an outer circumferential surface and front and rear lateral shoulders facing one another in axially spaced relationship, said front shoulder extending laterally outwardly farther than said rear shoulder,
said seal element removably mounted on said body and comprising an annular ring member formed of elastomeric material and including:
a forwardly facing front surface engaging said front shoulder,
a rearwardly facing rear surface engaging said rear shoulder,
an inner circumferential surface engaging said outer circumferential surface of said valve body, and
an outer circumferential surface engageable with said seat surface, said outer circumferential surface having front and rear ends and being of concave configuration and tapering in a forward direction, said front end disposed radially outwardly beyond said front shoulder when said seal element is in a relaxed state,
said rear surface including an annular rearwardly open recess therein which includes first and second sidewalls extending in generally front-to-rear directions, said recess having a depth extending forwardly beyond a longitudinal rear end of said concave surface to define therewith a flexible lip.

18. A valve assembly according to claim 17, wherein said depth extends at least about one-third of the distance from a longitudinal rear end of said concave surface to a longitudinal front end thereof.

19. A valve comprising:
a rigid valve body defining a front-to-rear extending axis and comprising an outer circumferential surface and front and rear lateral shoulders facing one another in axially spaced relationship, said front shoulder extending laterally outwardly farther than said rear shoulder, and
a resilient seal element removably mounted on said body and comprising an annular ring member formed of elastomeric material and including:

a forwardly facing front surface engaging said front shoulder,
a rearwardly facing rear surface engaging said rear shoulder,
an inner circumferential surface engaging said outer circumferential surface of said valve body, and an outer circumferential surface engageable with a rigid valve seat, said outer circumferential surface being of concave configuration and tapering in a forward direction, said concave surface being smoothly radiused between its longitudinal front and rear ends and being engageable with a frusto-conical seat surface, said rear surface including an annular rearwardly open recess therein which includes first and second sidewalls extending in generally front-to-rear directions, said recess having a depth extending forwardly at least about one-third of the distance from said rear end to said front end of said concave surface to define therewith a flexible lip, said inner circumferential surface of said seal element including first and second cylindrical surface portions interconnected by a first frusto-conical interconnecting surface portion, said outer circumferential surface of said valve body including third and fourth cylindrical surface portions interconnected by a second frusto-conical interconnecting surface portion, said first and second cylindrical surface portions engaging said third and fourth cylindrical surface portions, said first interconnecting surface portion engaging said second interconnecting surface portion, said first, second, third and fourth cylindrical surface portions and said first and second interconnecting surface portions having longitudinal axes which coincide with said front-to-rear extending axis, said second and fourth cylindrical surface portions disposed rearwardly of, and having smaller diameters than, said first and fourth cylindrical surface portions, said second sidewall of said recess being frusto-conical and oriented parallel to said first and second interconnecting surface portions as said valve is viewed in longitudinal section.

* * * * *